United States Patent [19]

Bolotnikov et al.

[11] 4,304,984
[45] Dec. 8, 1981

[54] NON-CONSUMABLE ELECTRODE FOR PLASMA-ARC WELDING

[76] Inventors: Arkady L. Bolotnikov, Bolshoi prospekt, 67, kv. 20; David G. Bykhovsky, ulitsa Esenina, 32, korpus 2, kv. 95; Viktor N. Kiselev, Serebristy bulvar, 16, kv. 311; Yakov V. Rossomakho, prospekt Nauki, 14, korpus 1, kv. 231; Alexandr Y. Medvedev, ulitsa Kalyaeva, 3, kv. 17, all of Leningrad, U.S.S.R.

[21] Appl. No.: 57,442

[22] Filed: Jul. 13, 1979

[51] Int. Cl.³ .............................................. B23K 35/04
[52] U.S. Cl. .......................... 219/145.21; 219/146.21; 219/121 PR
[58] Field of Search .................. 219/145.21, 146.21, 219/121 PR, 75; 313/346 R

[56] References Cited

U.S. PATENT DOCUMENTS

| | | | |
|---|---|---|---|
| 2,952,573 | 9/1960 | Torti | 219/146.21 X |
| 3,198,932 | 8/1965 | Weatherly | 219/146.21 |
| 3,597,649 | 8/1971 | Byjbovsky | 219/146.21 X |
| 3,639,161 | 2/1972 | Trattner | 219/146.21 X |
| 3,930,139 | 12/1975 | Bykhovsky | 219/146.21 |
| 4,074,718 | 2/1978 | Morrison | 219/146.21 X |

*Primary Examiner*—Richard R. Kucia
*Attorney, Agent, or Firm*—Lackenbach, Lilling & Siegel

[57] ABSTRACT

A non-consumable electrode for plasma-arc welding in an atmosphere of carbon dioxide or carbon-dioxide-based mixtures, includes a holder of copper or copper alloys and an active insert of hafnium embedded in the holder, with a hafnium oxycarbide layer disposed on the surface of the insert, the latter also including a graphite layer applied over the hafnium oxycarbide layer. A method of manufacturing the non-consumable electrode includes the steps of joining the holder of copper or copper alloys to the active insert of hafnium, connecting the holder to the negative pole of the power supply, placing the non-consumable electrode in an atmosphere of carbon dioxide, connecting an additional electrode to the positive pole of the power supply with an electric arc struck between the electrodes, forming a hafnium oxycarbide layer on the surface of the active insert at an electric arc current of up to 0.2 I, and subsequently forming a graphite layer over the previously formed hafnium oxycarbide layer as the current is increased from 0.2 I to I at a rate not exceeding 40 amperes per second, where I is the operating current of the non-consumable electrode.

1 Claim, 5 Drawing Figures

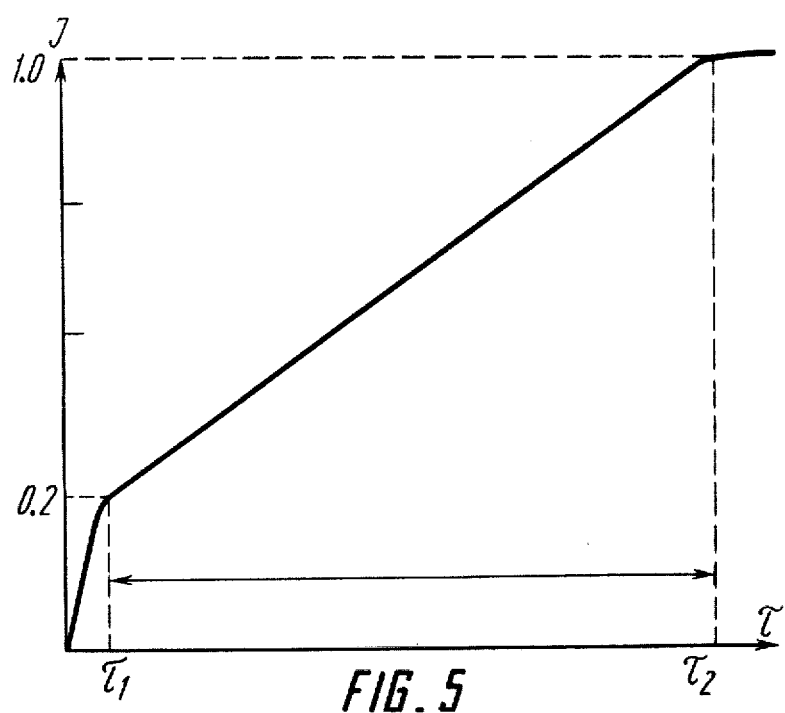

NON-CONSUMABLE ELECTRODE FOR PLASMA-ARC WELDING

FIELD OF THE INVENTION

The present invention relates to apparatus for plasma-arc treatment of metals, and more specifically to non-consumable electrodes for plasma-arc welding of metals in the atmosphere of carbon dioxide or carbon-dioxide-based mixtures.

The proposed non-consumable electrode for plasma-arc welding in carbon-dioxide or carbon-dioxide-based mixtures can most successfully be used for plasma-arc welding of low carbon and low alloy steels.

BACKGROUND OF THE INVENTION

In order that plasma-arc welding of steels in carbon-dioxide environment or in the atmosphere of carbon-dioxide-based mixtures could compete with other widely known methods of welding, such as consumable electrode submerged-arc welding or consumable electrode carbon-dioxide-shielded arc welding, or consumable electrode carbon-dioxide-based mixture shielded arc welding, the non-consumable electrodes for plasma-arc welding in the atmosphere of carbon-dioxide or carbon-dioxide-based mixtures are required to provide an operating life sufficient for commercial use, with electric arc currents in excess of 400 A.

For example, when welding low carbon and low alloy steels without edge preparation, in order to obtain speeds of plasma-arc welding in carbon-dioxide or carbon-dioxide-based mixture atmospheres equal to or exceeding the welding speeds when using known methods, the non-consumable electrodes for plasma-arc welding are required to provide an operating life suitable for commercial use, with electric arc currents ranging from 400 to 1000 A.

Known in the art is a non-consumable electrode for plasma arc treatment in an atmosphere of chemically reactive plasma-generating gases including carbon dioxide, comprising a liquid-cooled metal holder made of copper and an insert of zirconium, metallurgically bonded thereto (cf. U.S. Pat. No. 3,198,932).

As this non-consumable electrode operates in a carbon-dioxide atmosphere, the reactive insert of zirconium chemically reacts with active components of plasma-generating gas, i.e. carbon and oxygen. Over the entire surface of the insert a film is formed consisting of zirconium-carbon and zirconium-oxygen compounds, which will be referred to below as zirconium oxycarbide layer. The film of zirconium oxycarbide exhibits a high thermal stability and improved emission properties as compared to metallic zirconium. The above non-consumable electrode has found application in apparatus for plasma-arc cutting and welding of metals with electric arc currents of up to 300 A.

In plasma-arc-carbon-dioxide-shielded arc treatment with electric arc currents exceeding 300 A, the operating life of such an electrode, however, is not suitable for commercial use. This actually prevents its being employed for plasma-arc welding of low carbon and low alloy steels more than 6 mm thick in an atmosphere of carbon-dioxide or carbon-dioxide-based mixtures.

Also known in the prior art is a non-consumable electrode for plasma-arc treatment of metals in chemically reactive plasma-generating atmospheres containing oxygen, nitrogen and/or carbon.

This non-consumable electrode comprises a holder of copper or copper alloys and an insert of hafnium (cf. U.S. Pat. No. 3,592,649).

As this non-consumable electrode is operated in a carbon-dioxide atmosphere, the insert of hafnium chemically reacts with active components of the plasma-generating gas, i.e. carbon and oxygen. Over the entire operating surface of the active insert a layer of the hafnium oxycarbide is formed which exhibits a higher thermal stability and improved emission properties than the zirconium oxycarbide layer.

The operating life of such a non-consumable electrode enables it to be employed for plasma-arc treatment in a carbon-dioxide atmosphere with electric arc currents of up to 400 A. It is higher than the operating life of electrodes having an active insert of zirconium.

For higher electric current applications, e.g. for electric arc currents in excess of 400 A, however, also becomes impractical on account of an increased rate of electrode erosion.

Thus, the non-consumable electrode with an active insert of hafnium cannot be used for plasma-arc welding of low carbon and low alloy steels having a thickness exceeding 6 mm in an atmosphere of carbon-dioxide or carbon-dioxide-based mixtures.

Another prior art cathode for electric arc processes in chemically reactive atmospheres includes a copper holder and an active insert composed essentially of hafnium and alloying additions of various metals and/or their oxides.

This cathode exhibits a lower rate of erosion as compared with the electrode having an active insert of pure hafnium only when the electric arc is operated in an intermittent cycle mode. For all operational modes, however, the operational life of such a cathode enables it to be used in plasma-arc treatment in a carbon-dioxide atmosphere with electric arc currents not exceeding 400 A.

Thus, the cathode with an active insert of hafnium with alloying additions cannot be employed for plasma arc welding of low carbon and low alloy steels over 6 mm thick in an atmosphere of carbon dioxide or carbon-dioxide-based mixtures.

The abovementioned electrode disclosed in U.S. Pat. No. 3,198,932 is produced by placing a chemically pretreated active insert of zirconium into the copper holder, simultaneously heating holder-and-insert combination to provide a metallurgical bond between the active insert and the copper holder.

The remainder of electrodes described above are manufactured by mechanically placing the active insert into the copper holder using such methods as cold stamping or other similar methods.

In all the electrodes described above the film of oxycarbide of the corresponding material of an active insert is obtained as an electric arc burns in a carbon-dioxide atmosphere.

SUMMARY OF THE INVENTION

It is an object of the present invention to eliminate the previously mentioned disadvantages.

Another object of the present invention is to provide a non-consumable electrode for plasma-arc welding in atmospheres of carbon dioxide or carbon-dioxide-based mixtures at electric arc currents in excess of 400 A with an operating life suitable for commercial use.

Still another object of the present invention is to provide an electrode for plasma-arc welding in atmospheres of carbon dioxide or carbon-dioxide-based mixtures at electric arc currents permitting welding of low carbon and low alloy steels more than 6 mm thick.

A further object of the present invention is to provide a non-consumable electrode for plasma-arc welding in an atmosphere of carbon dioxide or carbon-dioxide-based mixtures ensuring welding speeds for low carbon and low alloy steels being welded, without edge preparation, which are equal to or in excess of the speeds of welding by conventional methods.

With these and other objects in view there is proposed a non-consumable electrode for plasma-arc welding in an atmosphere of carbon dioxide or carbon-dioxide-based mixtures which includes a holder of copper or copper alloys and an active insert of hafnium embedded therein, with a film of hafnium oxycarbide on the surface of the insert, wherein, according to the invention, the active insert also includes a layer of graphite applied onto the hafnium oxycarbide layer.

The graphite layer applied over the hafnium oxycarbide layer and forming the surface of the active insert ensures a decrease in the heat flow incident onto the non-consumable electrode and an increase in thermal stability and emissive properties of the proposed non-consumable electrode.

It is preferable that the amount of graphite in the layer provided over the hafnium oxycarbide layer be determined by the height and diameter of the active insert as chosen according to the following relationship:

$$h = (0.25 \text{ to } 0.75) d,$$

where h is the height of the active insert,
d is the diameter of the active insert.

In order to prolong the operating life of the electrode by formation of the graphite layer on the major portion, or at best, on the entire surface of the hafnium oxycarbide layer, as well as by continuously maintaining the graphite layer thus formed during operation of the non-consumable electrode at operating electric arc currents, it is necessary to provide both more intense and more uniform cooling of the active insert.

To satisfy these requirements, the inventors suggest the geometrical dimension of the active insert (i.e. height and diameter) be chosen so that the height is smaller than the diameter.

It has been experimentally found that with the height of the active insert less than 0.25 of its diameter, i.e. with the most intense cooling of the insert, the non-consumable electrode comes to be inoperative. This is due to the fact that as the material of the emitting surface is supercooled, cathode spot contraction occurs, the electric arc becomes spatially unstable and the non-consumable electrode is rapidly destroyed. With the height of the active insert in excess of 0.75 the diameter thereof, the conditions of the minimal radial temperature gradient on the layer of hafnium oxycarbide are disturbed to such an extent that formation and continuous maintenance of the graphite layer is made impossible, this resulting, in turn, in a sudden destruction of the non-consumable electrode.

With these and other objects in view there is proposed also a method of manufacture of a non-consumable electrode for plasma-arc welding, consisting in attachment of a copper or copper alloy holder to an active insert, wherein, according to the invention, the holder of copper or copper alloys is connected to the negative pole of the power supply, the non-consumable electrode is placed in an atmosphere of carbon dioxide, an auxiliary electrode is connected to the positive pole of the power supply with formation of an electric arc struck between said electrodes, a hafnium oxycarbide layer being preformed on the surface of the active insert at an electric arc current level up to 0.2 I, and then the current being raised from 0.2 I up to I at a rate not exceeding 40 A per second with the formation of a graphite layer over the previously formed hafnium oxycarbide layer, where I is the operating current of the non-consumable electrode.

The time required to form the hafnium oxycarbide layer, as the electric arc is struck, is of the order of 0.05 to 0.5 second. In order that the entire surface of the active insert be coated with a layer of hafnium oxycarbide, it is sufficient to maintain the electric arc current amounting to only 0.2 of the full operating current I of the non-consumable electrode.

While it is sufficient, for the initial stage of formation of the layer of hafnium oxycarbide to maintain the current at the level of 0.2 I, for the subsequent formation of the graphite coating over the surface of the hafnium oxycarbide layer it is necessary to increase gradually the electric arc current from 0.2 I to the full electric arc current I at a rate of no more than 40 A per second.

If the gradual increase in the electric arc current I starts from the values exceeding 0.2 I and at speeds above 40 A per second, the surface of the hafnium oxycarbide layer is caused to be overheated, and the radial temperature distribution is drastically disturbed, this preventing formation of the graphite coating.

Foregoing and other objects, features and advantages of the present invention will become apparent from the following more specific description thereof as illustrated in the accompanying drawings, wherein:

FIG. 5 shows electric arc current plotted versus time during the fabrication of the non-consumable electrode, according to the invention.

Figure 1:
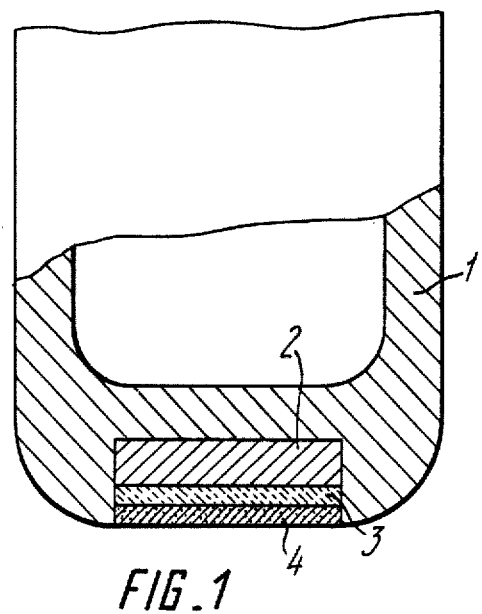
FIG. 1 is a sectional view of a non-consumable electrode according to the invention.

During operation of the non-consumable electrode, which includes a holder and an active insert, the latter is subjected to erosion, a crater is formed and the full operating life is determined by burning out of the active insert at its full depth. It has been experimentally shown that as the non-consumable electrodes are operated in an atmosphere of carbon dioxide or carbon-dioxide-based mixtures, at electric arc currents above 400 A, the erosion rate of the active insert tends to increase rapidly. This rapid burning out of the non-consumable electrode in an atmosphere of carbon dioxide or carbon-dioxide-based mixtures is attributable to the fact that as the active insert is subjected to erosion and the column of the electric arc is immersed into the crater formed during operation of the non-consumable electrode, the heat flow tends to increase and a catastrophic destruction of the electrode occurs.

A small proportion of the non-consumable electrodes (about 10% of the total number of the electrodes under test), however, maintained the stable operation in an atmosphere of carbon dioxide or carbon-dioxide based mixtures for several hours. An analysis of the structure of the work surface of the active hafnium insert of the non-consumable electrodes investigated has shown that all the stable non-consumable electrodes have the hafnium oxycarbide layer (on the surface of the active hafnium layer) coated with a graphite film, whereas the non-consumable electrodes exhibiting a high rate of erosion have all the hafnium oxycarbide layer with no graphite film thereon.

Consequently, a one-to-one relationship has been found by the inventors between the increased durability of the non-consumable electrode in an atmosphere of carbon dioxide or carbon-dioxide-based mixtures at electric arc currents above 400 amperes, and the presence of the graphite layer on the work surface of the hafnium oxycarbide film coating the work surface of the active hafnium insert.

It has been experimentally shown that the greater portion of the surface of the hafnium oxycarbide layer is coated with a graphite film, the longer is the operating life of the non-consumable electrode in atmospheres of carbon dioxide or carbon-dioxide-based mixtures. Again, it has turned out that the graphite layer over the hafnium oxycarbide layer is invariably formed in a direction from the periphery of the work surface towards the center, i.e. on those portions of the hafnium oxycarbide layer having the lowest operating temperature.

In the inventor's opinion, the graphite layer on the surface of the hafnium oxycarbide film results from interaction of hafnium oxycarbide with carbon monoxide produced due to thermal dissociation of carbon dioxide in the near-cathode region of the electric arc column.

The main feature of this interaction is a narrow temperature interval, not exceeding 500° C., within which graphite is formed as a result of the interaction. This fact is responsible for the experimentally observed formation of the graphite layer on the peripherial portion of the hafnium oxycarbide layer surface, where the operating temperature of the layer, on the one hand, is minimal, and on the other hand, it has a low radial gradient.

Another significant feature of the interaction between hafnium oxycarbide and carbon monoxide is the fact that this interaction occurs at a high absolute temperature level, in excess of 2500° C.

With such temperature levels, the graphite layer can account for the bulk of the electric arc current due to the thermionic emission current, bringing about an increase in the operating life of the non-consumable electrode, which occurs with increasing area of that portion of the work surface of the hafnium oxycarbide layer coated with graphite.

Experimental studies of the dependence of the non-consumable electrode operating life on the surface area of the hafnium oxycarbide layer coated with graphite have demonstrated that while the maximum operating life of the non-consumable electrode is obtained in case the entire surface if the hafnium oxycarbide layer is coated with graphite, the operating life acceptable for commercial use of the non-consumable electrode for the plasma-arc welding in the carbon dioxide atmosphere, at electric arc currents exceeding 400 A is obtained (with the proposed geometry of the active insert) provided the graphite layer is formed and continuously maintained, during operation of the non-consumable electrode, on an area of at least 0.25 of the total work surface of the hafnium oxycarbide layer.

Based on these assumptions, there was provided a non-consumable electrode for plasma-arc welding in atmospheres of carbon dioxide or carbon-dioxide-based mixtures, comprising a holder 1 (FIG. 1) made of copper or copper alloys and an active insert 2 of hafnium embedded in the holder flush therewith. The outer surface of the insert 2 has provided thereon a layer 3 of hafnium oxycarbide.

The layer 3 of hafnium oxycarbide is coated with a layer 4 of graphite.

Precoating of the hafnium oxycarbide layer 3 with the graphite layer 4 ensures a high resistance of the nonconsumable electrode when used in plasma-arc welding in atmospheres of carbon dioxide and carbon-dioxide-based mixtures, where the proposed non-consumable electrode serves as a cathode of the electric arc plasma torch. The favourable effect consists in that the combination of the hafnium oxycarbide layer 3 and the graphite layer 4 on the emitting surface of the active insert 2 of hafnium results in a non-consumable electrode with the minimum work function for electron emission. The The minimization of the work function for electron emission enables a lower operating temperature to be obtained on the emitting surface of the non-consumable electrode, with a specified electric arc current, whereby the heat flow into the non-consumable electrode is reduced.

As a consequence, the thermal erosion of the active insert 2 is caused to decrease, which prolongs the operating life of the non-consumable electrode.

Figure 2:
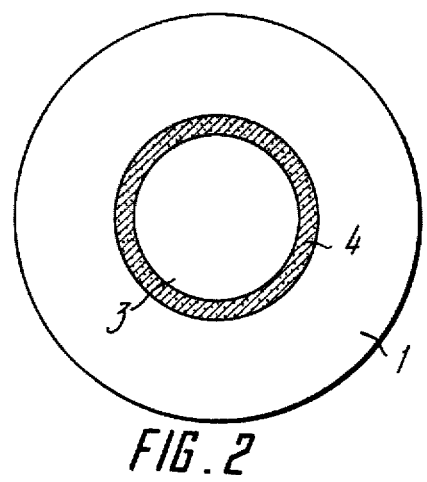
FIG. 2 is a view as shown by the arrow A in the FIG. 1.

In FIG. 2 showing the non-consumable electrode viewed from the side of the work surface, the graphite layer 4 covers the hafnium oxycarbide layer 3 but partially. It has been found out that the graphite layer 4 should be applied over the layer 3 in a direction from the joint between the hafnium oxycarbide layer 3 and the holder 1 towards the axis of the non-consumable electrode.

It has been experimentally found that to provide satisfactory performance of the non-consumable electrode at currents above 400 A, it is sufficient that the graphite layer 4 cover 0.25 of the total surface of the hafnium oxycarbide layer 3.

The reduction in heat flow improves the thermal stability of the non-consumable electrode, i.e. it minimizes erosion of the active insert 2.

Figure 3:
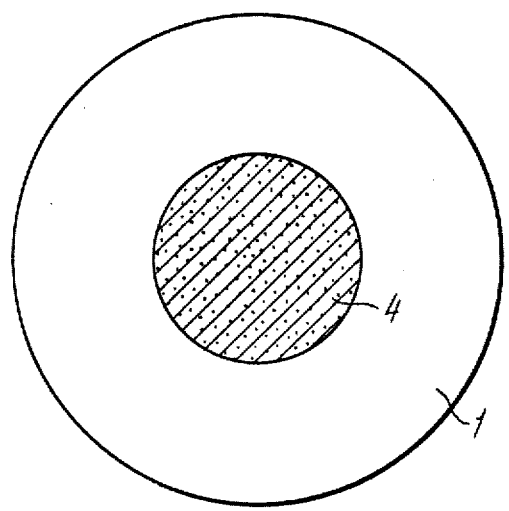
FIG. 3 shows another embodiment of a non-consumable electrode as viewed along the arrow A in FIG. 1.

In an embodiment of FIG. 3, the graphite layer 4 completely covers the hafnium oxycarbide layer 3. In this case, the highest operating performance of the non-consumable electrode enabling the plasma-arc welding to be carried out in atmospheres of carbon dioxide or carbon-dioxide-based mixtures, at electric arc currents up to 1000 A, is realized.

Specific embodiments of the proposed non-consumable electrode and examples of testing the non-consumable electrode employed in plasma-arc welding of low carbon and low alloy steels in atmospheres of carbon dioxide or carbon-dioxide based mixtures are given below.

EXAMPLE 1

In a non-consumable electrode comprising a copper holder 20 mm in dia. and an active insert of hafnium 3.6 mm in dia., a layer of hafnium oxycarbide was formed on the surface of the active insert and a layer of graphite formed on the entire work surface of the hafnium oxycarbide layer.

The active carbide was 0.9 mm high.

The non-consumable electrode was tested in a plasma torch with a nozzle 11 mm in diameter, in plasma arc welding modes, with the following process parameters:

| Material of the plates to be welded | low alloy steel type |
|---|---|
| Thickness of the plates to be welded, in mm | 18 + 18 |
| Plasma-forming gas | $CO_2$ |
| Arc current, in amperes | 1000 |
| Flow rate of plasma-forming gas, in litres per hour | 400 |

The plates were welded in the lower position without edge preparation with full penetration per pass, at a speed of 30 mph. The non-consumable electrode operating life taken as the total time of electric arc burning in the welding process amounted to 1 hour.

EXAMPLE 2

In a nonconsumable electrode comprising a copper holder 20 mm in diameter and an active insert of hafnium 3 mm in diameter, a hafnium oxycarbide layer was formed on the surface of the active insert. A graphite layer was formed on 0.75 of the surface of the hafnium oxycarbide layer. The height of the active insert was 1.5 mm.

The non-consumable electrode was tested in a plasma torch with a nozzle 8 mm in dia. in plasma-arc welding modes, with the following process parameters:

| Material of the plates to be welded | low alloy steel type |
|---|---|
| Thickness of the plates to be welded, in mm | 12 + 12 |
| Plasma-forming gas | mixture 90% $CO_2$ + 10% $O_2$ |
| Arc current, in amperes | 750 |
| Flow rate of plasma-forming gas, in liters per hour | 800 |

The plates were welded in the lower position without edge preparation with a through penetration per pass, at a speed of 50 mph. The operating life of the non-consumable electrode taken as the total time of electric arc burning in the welding process amounted to 1.7 hour.

EXAMPLE 3

In a non-consumable electrode comprising a copper holder 16 mm in dia. and an active insert of hafnium 2.6 mm in dia. a hafnium oxycarbide layer was formed on the surface of the active insert. A graphite layer was formed on 0.25 of the surface of the hafnium oxycarbide layer. The height of the active insert was 1.9 mm.

The non-consumable electrode was tested in a plasma torch with a nozzle 8 mm in dia. in plasma-arc welding modes, with the following process parameters:

| Material of the plates to be welded | low alloy steel type |
|---|---|
| Thickness of the plates to be welded, in mm | 6 + 6 |
| Plasma-forming gas | carbon dioxide |
| Arc current, in amperes | 450 |
| Flow rate of the plasma-forming gas, in liters per hour | 300 |

The plates were welded in the lower position without edge preparation with a through penetration per pass, at a speed of 50 mph. The operating life of the non-consumable electrode taken as the total time of electric arc burning in the welding process amounted to 7 hours.

EXAMPLE 4

In a non-consumable electrode comprising a copper holder 20 mm in dia. and an active insert of hafnium 3 mm in dia., a hafnium oxycarbide layer was formed on the surface of the active insert. A graphite layer was formed on 0.85 of the surface of the hafnium oxycarbide layer. The height of the active insert was 1.2 mm.

The non-consumable electrode was tested in a plasma torch with a nozzle 9 mm in dia. in plasma-arc welding modes, with the following process parameters:

| Material of the plates to be welded | low alloy steel type |
|---|---|
| Thickness of the plates to be welded, in mm | 8 + 8 |
| Plasma-forming gas | $CO_2$ |
| Arc current, in amperes | 800 |
| Flow rate of the plasma-forming gas, in lph | 1000 |

The plates were welded in the lower position without edge preparation with a through penetration per pass, at a speed of 80 mph. The operating life of the non-consumable electrode taken as the total time of electric arc burning in the welding process amounted to 2.1 hours.

In order to obtain the graphite layer over the hafnium oxycarbide layer, and for uniformly maintaining of the graphite coating as the non-consumable electrode was used for plasma-arc welding in an atmosphere of carbon dioxide or carbon-dioxide-based mixtures, it is expedient that the graphite layer be applied over the hafnium oxycarbide layer beforehand, i.e. prior to employing of the non-consumable electrode for plasma-arc welding.

It has been experimentally found by the inventors that the favourable effect of the graphite layer applied over the hafnium oxycarbide layer can be only obtained if the non-consumable electrode is treated by an electric arc burning in an atmosphere of carbon dioxide, when the non-consumable electrode treated serves as a cathode, i.e. the electrode connected to the negative pole of the electric arc current source. This is proved by experiments conducted by the inventors, wherein the non-consumable electrode treated by the electric arc served as an anode, i.e. it was connected to the positive pole of the electric arc current source. In all these experiments, without any exception, no graphite layer was formed on the work surface of the active insert, resulting in a rapid destruction of the non-consumable electrode.

It was also found by the inventors that when the non-consumable electrode (as a cathode) was treated by the electric arc burning in an atmosphere of carbon dioxide, the hafnium oxycarbide layer was formed on the surface of the active insert practically immediately after the electric arc was excited.

While the conditions of the hafnium oxycarbide layer formation (i.e. electric arc current and burning period of the electric arc) may widely vary, the conditions of the graphite layer formation on the hafnium oxycarbide layer, as the experiments have shown, are strictly specified.

This arises from the necessity to maintain a definite temperature and a definite temperature gradient on the work surface of the hafnium oxycarbide layer, which are involved in the formation of the graphite layer.

By comparing the experimental results and the thermal properties of the hafnium oxycarbide layer, the active insert of hafnium, and the copper holder, the inventors have come to the conclusion that in order to satisfy the aforementioned conditions of providing the graphite coating, it is necessary to observe a definite rate of increase in the electric arc current, as well as a definite mode of connection of the non-consumable electrode into the current source circuit.

Figure 4:
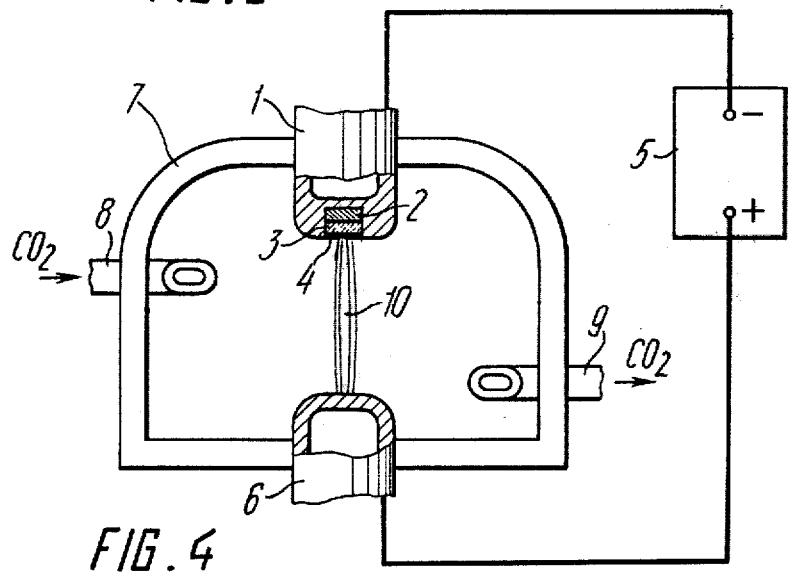
FIG. 4 is a schematic representation of a block-diagram illustrating a method of manufacture of the non-consumable electrode according to the invention.

The arrangement for implementing the method of fabrication of the non-consumable electrode comprises a d.c. power supply (FIG. 4) with the negative pole connected to the holder 1 of the non-consumable electrode, while the positive pole thereof is connected to an additional electrode 6. The holder 1 having embedded therein the active insert 2 of hafnium is disposed in a chamber 7 provided with a means 8 for admission of carbon dioxide and a means 9 for exhaustion of carbon dioxide.

The non-consumable electrode comprising the copper holder 1 with the active insert 2 of hafnium presealed into the holder flush therewith is placed within the chamber 7 and connected to the d.c. power supply 5. Carbon dioxide is supplied to the chamber 7. An electric arc 10 is then excited between the active insert 2 of hafnium and the additional electrode 6 previously connected to the positive pole of the d.c. power supply 5. A curve 11 is shown in FIG. 5, which indicates the electric current value as a function of time, with the value of the current of the electric arc 10 taken as an ordinate and the time needed for fabrication of the non-consumable electrode taken as an abscissa.

On examination of the curve 11, it will be seen that after the current of the electric arc 10 has been excited for the period $\tau \leq 0.5$ s. at a current I of the electric arc 10 not exceeding 0.2 I; the layer 3 of hafnium oxycarbide is formed on the emitting surface of the active insert 2 of hafnium, which hafnium oxycarbide layer covers the entire emitting surface of the active hafnium insert 2. The current I of the electric arc 10 is then increased, without interruption of the arc burning, at a rate not exceeding 40 A/s, up to the full operating current of the non-consumable electrode, resulting in the graphite layer 4 formed on the hafnium oxycarbide layer 3. The electric arc is then extinguished. In this case, if the total burning time is $\tau_1 < \tau < \tau_2$ the graphite layer 4 covers the hafnium oxycarbide layer 3 partially, but no less than 0.25 of the hafnium oxycarbide layer 3. If $\tau \geq \tau_2 = I/40$ g/s (where I is the full operating current of the non-consumable electrode) the graphite layer 4 entirely covers the hafnium oxycarbide layer 3.

The proposed method of fabrication the non-consumable electrode for welding in an atmosphere of carbon dioxide or carbon-dioxide-based mixtures permits application of the hafnium oxycarbide layer over the active insert during one cycle of the electric arc burning and application of a graphite layer thereover.

Specific embodiments of the present invention disclosed above in no way limit the scope of the invention. Various modifications and versions of the invention are possible without departure from the spirit and scope thereof, as described in the following claims.

What is claimed is:

1. A non-consumable electrode for plasma-arc welding in a medium of carbon dioxide or carbon-dioxide-based mixtures, comprising a holder made of copper or copper alloys, and a cylindrical insert made of hafnium and embedded flush in said holder, said insert having on its surface a layer of hafnium oxycarbide, characterized in that the active insert contains a layer of graphite applied to the layer of hafnium oxycarbide, the height and the diameter of said cylindrical insert being chosen in accordance with the following ratio:

$$h = (0.25 \text{ to } 0.75) \, d,$$

wherein h is the height of the active insert and d is the diameter of the active insert.

* * * * *